US008656906B2

(12) United States Patent
Mulcey

(10) Patent No.: US 8,656,906 B2
(45) Date of Patent: Feb. 25, 2014

(54) HIGH-YIELD THERMAL SOLAR PANEL

(75) Inventor: Philippe Mulcey, Irigny (FR)

(73) Assignee: Helioprocess, Irigny (FR)

( * ) Notice: Subject to any disclaimer, the term of this patent is extended or adjusted under 35 U.S.C. 154(b) by 0 days.

(21) Appl. No.: 13/580,506

(22) PCT Filed: Feb. 23, 2011

(86) PCT No.: PCT/FR2011/050376
§ 371 (c)(1),
(2), (4) Date: Dec. 5, 2012

(87) PCT Pub. No.: WO2011/104479
PCT Pub. Date: Sep. 1, 2011

(65) Prior Publication Data
US 2013/0074830 A1    Mar. 28, 2013

(30) Foreign Application Priority Data
Feb. 23, 2010 (FR) .................................. 10 51289

(51) Int. Cl.
*F24J 2/12* (2006.01)
(52) U.S. Cl.
USPC ............ 126/657; 126/694; 126/704; 126/676
(58) Field of Classification Search
USPC ..................... 126/657, 694, 704, 676, 617
See application file for complete search history.

(56) References Cited

U.S. PATENT DOCUMENTS

| 4,007,729 A | 2/1977 | Chao |
| 4,011,855 A | 3/1977 | Eschelman |
| 4,239,034 A | 12/1980 | Niedermeyer |
| 4,529,830 A | 7/1985 | Daniel |
| 6,119,683 A | 9/2000 | Nakauchi |

FOREIGN PATENT DOCUMENTS

| DE | 30 26 800 | 1/1982 |
| DE | 88 06 127 U1 | 7/1988 |
| DE | 3815751 | 11/1989 |
| EP | 1 767 882 A2 | 3/2007 |
| FR | 2 172 464 | 9/1973 |
| FR | 2 410 230 | 6/1979 |
| GB | 2009391 | 6/1979 |

OTHER PUBLICATIONS

"Some aspects regarding I.R. absorbing materials based on thin alumina films for solar-thermal energy conversion, using X-ray diffraction technique", by Mitrea S. A., Hodorogea S. M., Duta A., Isac L., Purghel E. & Voinea M., in "Engineering and Technology" — 2008, vol. 47—World Academy of Science.
"Optimization of a solution chemically derived spectrally selective solar absorbing surface", by Bostrom T., Westin G. & Wäkelgard E., in Solar Energy Materials and Solar Cells—2007, vol. 91, pp. 38-43.

*Primary Examiner* — Alfred Basichas
(74) *Attorney, Agent, or Firm* — Davidson, Davidson & Kappel, LLC

(57) ABSTRACT

The solar panel includes a housing for a heat collecting element, delimited by walls, one of which includes slits for the passage of solar rays. At least one reflective area is arranged to face the heat collecting element. At least one reflective strip is arranged outside the housing to face a respective slit so as to focus the solar rays received towards this slit. Elongated reflective elements are arranged side by side, and include coplanar flat bases, forming together the wall of the housing having slits and the flat base of at least one elongated reflective element forming a reflective area of this wall of the housing, and including one concave surface arranged to face the reflective strips such that the solar rays reflected by each concave surface are focused towards the corresponding reflective strip.

18 Claims, 6 Drawing Sheets

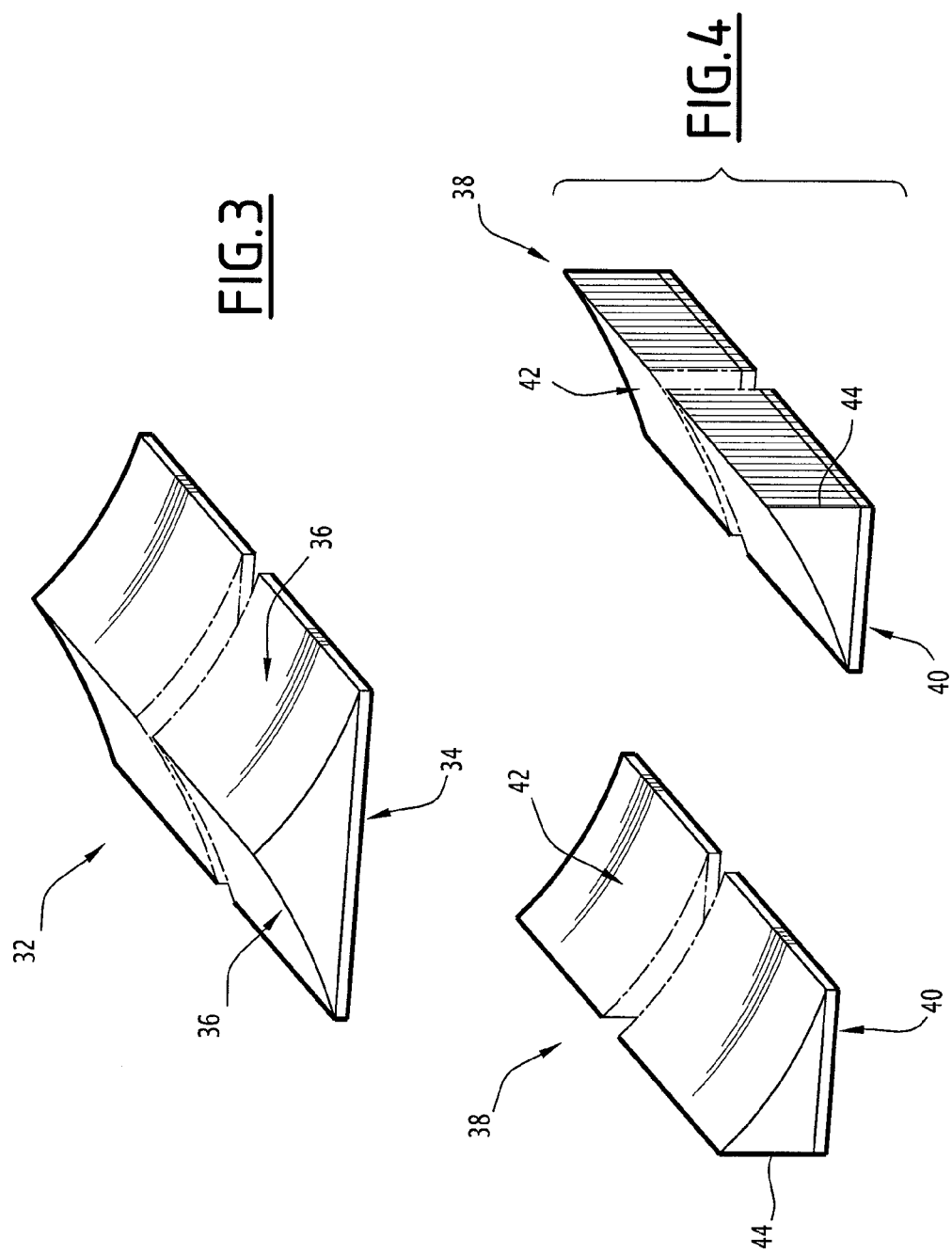

HIGH-YIELD THERMAL SOLAR PANEL

This invention concerns a thermal solar panel intended for the storage and release of solar thermal energy.

BACKGROUND

A thermal solar panel of the type comprising at least one heat collecting element intended to receive solar rays is known from prior art. Such a solar panel is used, e.g., for coupling with a heat engine in order to transform solar heat energy into electrical or mechanical energy. In one variant, the solar heat energy may also be recovered in order to produce heat or cooling, e.g., for a heating or air-conditioning system.

Normally, the heat collection element is generally tubular in shape, and is arranged in a glass vacuum tube, coaxially with the glass tube. The solar panel includes, inter alia, reflective elements so as to focus the solar rays received on the heat collecting element.

The heat energy of the solar rays is then replaced by means of a coolant circulating in the core of the heat collecting element by means of heat transfer between the collector and the coolant.

The thermal performance of such a solar panel is generally limited by heat losses due to thermal radiation emitted by the heat collecting element. This thermal radiation is substantial, in particular, in case of high temperature and large surface area of the collector.

Thus, such a solar panel generally has low performance at high temperatures, e.g., at temperatures greater than 400° C.

SUMMARY OF THE INVENTION

It is an object of the present invention to provide a thermal solar panel with satisfactory performance even at elevated temperatures.

The present invention provides a thermal solar panel of the type comprising at least one heat collecting element to receive solar rays, characterised in that the panel includes:

a housing for the heat collecting element, which housing is delimited by walls surrounding the heat collecting element, whereby at least one of the walls of the housing includes at least one slit for the passage of solar rays, preferably several slits.

at least one reflective area arranged facing the heat collecting element, which reflective area is suited to reflect thermal radiation emitted by the heat collecting element, at least one reflective strip, arranged outside of the housing, whereby each reflective strip is arranged facing one respective slit so as to focus radiation received towards that slit, and several elongated reflective elements, whereby each elongated reflective element includes a flat base and two concave surfaces, such that the elongated reflective element has a perceptively triangular cross section, and the elongated reflective elements are arranged side by side such that their flat bases are coplanar and, together, form the slitted wall of the housing, whereby each slit is formed by a space between two adjacent elongated reflective elements, and each concave surface is arranged facing a reflective strip, such that radiation reflected by a concave surface is focused towards the corresponding reflective strip.

Because of the at least partially reflective wall of the housing, at least part of the thermal radiation emitted by the collector is reflected by the reflective area, to be re-absorbed by this collector.

Thus, the thermal radiation is not completely lost. In other words, the thermal loss is limited, and the thermal performance of the solar panel is thus increased.

Additionally, it will be noted that better performance is obtained by focusing the thermal radiation with mirrors than with the known-art method of focusing it with lenses.

In fact, a lens-based focusing device has undesirable achromatic effects because the angle of refraction of the light rays by the lenses depends on their wavelength, leading to an enlargement of the image that can only be corrected by adding a corrective lens. The result is that such a lens-base focusing device is relatively complex, and allows for a lower solar radiation transmission performance than a mirror-based focusing device.

Preferably, a thermal solar panel according to the invention includes one or more of the following characteristics, taken alone or in all technically possible combinations.

Each pair of adjacent reflective elements forms a primary parabolic mirror, having a slit in its centre; the reflective strip arranged to face this pair of reflective elements forms a secondary hyperbolic convex mirror, and the reflective elements and reflective strip are arranged such that the optical axes of the primary and secondary mirrors coincide, and the focus of the primary parabolic mirror coincides with one of the foci of the hyperbolic mirror.

Each pair of adjacent reflective elements forms a primary parabolic mirror, having a slit in its centre; the reflective strip arranged to face this pair of reflective elements forms a secondary elliptical convex mirror, and the reflective elements and reflective strip are arranged such that the optical axes of the primary and secondary mirrors coincide, and the focus of the primary parabolic mirror coincides with one of the foci of the elliptical mirror.

Each wall of the housing has at least one reflective area arranged to face the heat collecting element, which reflective area extends preferably over the entirety of the wall.

The housing includes thermal insulation spacers, arranged between the heat collecting element and at least one wall of the housing.

The thermal solar panel is generally plane-parallel in shape defined by lateral faces, one lower face, and one upper face, delimiting together an internal space in which the housing is arranged, such that the housing includes one lower wall formed by the lower face, the housing includes lateral walls formed by the lateral faces, the housing includes one upper wall, arranged between the upper and lower faces of the panel, parallel to these faces, comprising the at least one slit, and the upper face is formed by a transparent plate, preferably made of glass.

The thermal solar panel includes means of transporting heat, comprising : a heat exchanger between the heat collecting element and a coolant, housed within the heat collecting element, at least one tubular element for the transfer of the coolant, connecting the heat exchanger to the outside of the solar panel, passing through an orifice located in a wall of the housing, and at least one airtight, thermally insulating joint between the tubular element and the orifice.

The heat collecting element includes a wrapping capable of absorbing the solar and/or thermal radiation, preferably metallic, enveloping a phase-changing material.

The phase-changing material is chosen from anthraquinone or aluminium.

The heat collecting element is formed by a tubular element, in which a coolant circulates, which tubular element is preferably provided with a highly heat-absorbent external coating and has low thermal emission.

A reflective area is formed by a tubular reflection element, coaxially surrounding the tubular heat collecting element, which tubular reflection element is formed by an insulating material having an internal surface that is treated, e.g., metal coated, in order to make it reflect residual thermal radiation emitted by the tubular heat collection element, and including on its upper generator a slit so as to let incident thermal radiation pass through.

The thermal solar panel includes at least one thermal fluid introduction or evacuation element connected to all of the heat collecting elements, housed within a surrounding wall laterally extending the panel, delimited by walls made of thermally insulating material.

BRIEF DESCRIPTION OF THE DRAWINGS

The invention will be better understood based on the following description, provided by way of example only, referring to the attached drawings, in which:

FIGS. 3 and 4 are perspective views of reflective elements equipping the solar panel of FIG. 1;

DETAILED DESCRIPTION

Figure 1:
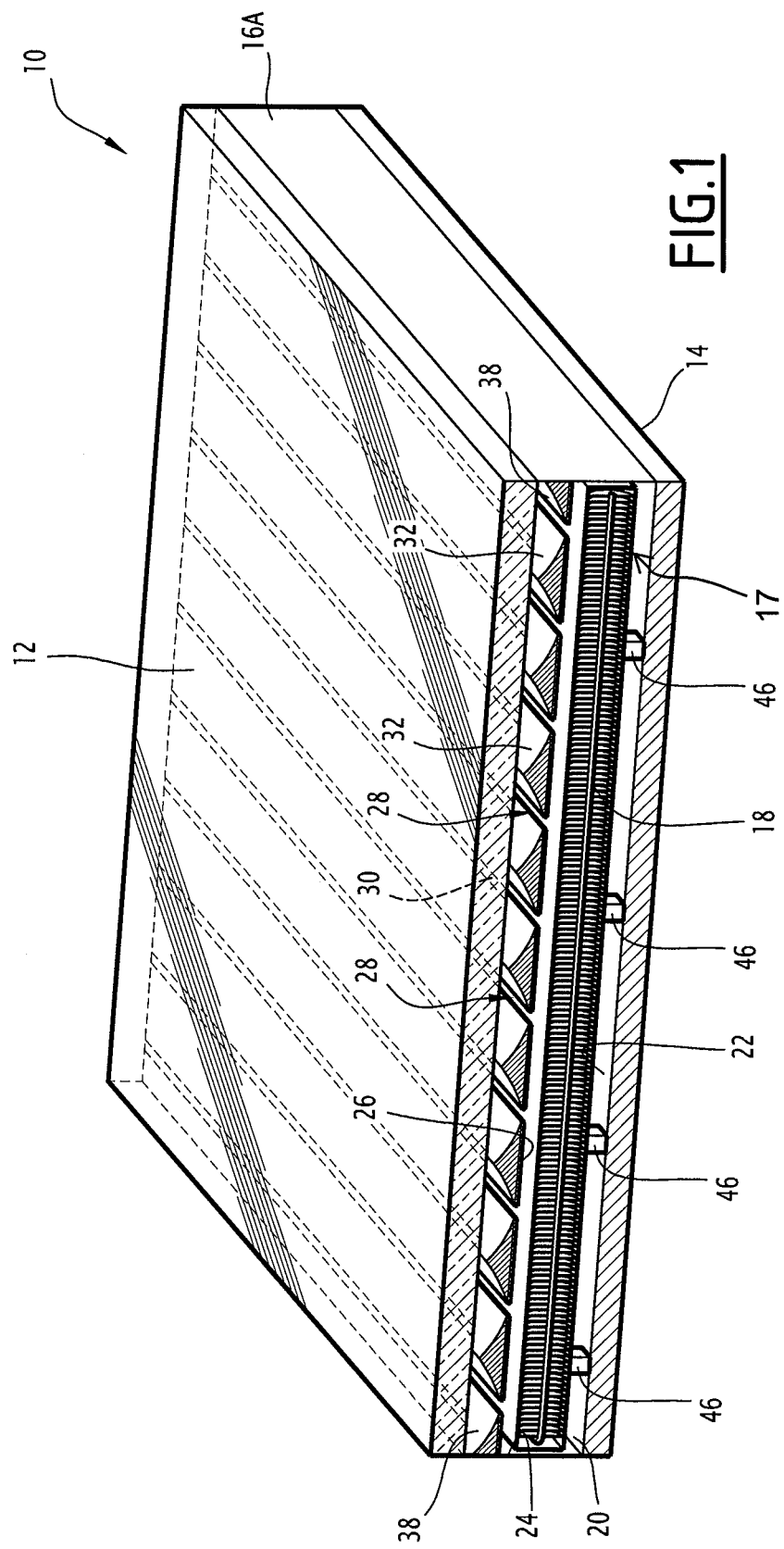
FIG. 1 is a perspective view of a solar panel in cross section, according to a first exemplary embodiment of the invention.
Figure 2:
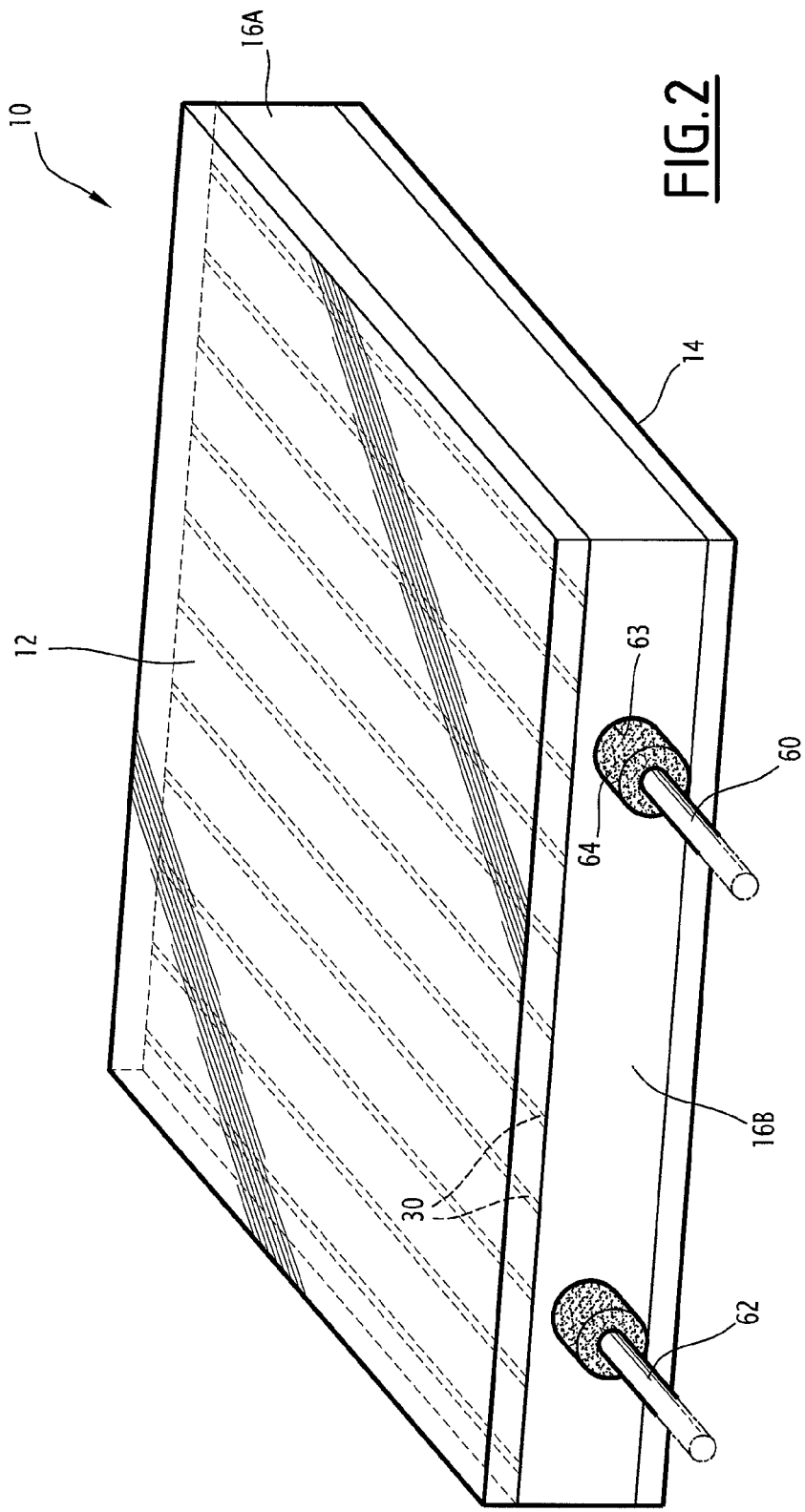
FIG. 2 is a perspective view of the solar panel of FIG. 1 in its entirety.

A thermal solar panel 10 according to a first exemplary embodiment has been represented in FIGS. 1 and 2.

The solar panel 10 is generally plane-parallel in shape, delimited by an upper face 12 to be turned to face the sun in order to receive solar rays, an inner face 14, opposite the upper face 12, and lateral faces, respectively longitudinal 16A and transverse 16B, joining the upper 12 and lower faces 14 between them. The solar panel 10 has, e.g., length and width defined by the upper 12 and lower faces 14, of approximately 1 m each, and a thickness, defined by the lateral faces 16A, 16B, between 8 and 20 cm.

The upper 12, lower 14, and lateral faces 16A, 16B together define a closed inner space 17, and are connected hermetically to one another, e.g., by adhesion, such that this inner space 17 is insulated hermetically from the air compared to the outside of the solar panel 10.

Advantageously, the air is extracted from the inner space 17 in order to create a vacuum. Thus, the elements arranged inside this inner space 17, which will be described below, are not subject to degradation due to oxidation caused by contact with air.

The upper face 12 is formed by a transparent plate, suited to allow the passage of solar rays. For example, this transparent plate 12 is made of glass, preferably with low iron content, so as to present an optimal solar ray transmission coefficient.

Advantageously, the external surface of the transparent plate 12 includes an anti-reflective coating intended to optimise its solar ray transmission coefficient.

The transparent plate 12 is substantially flat in shape, so as not to deviate the solar rays passing through the transparent plate 12. For example, the transparent plate 12 has a length and width of approximately 1 m each, and is between 1 and 2 cm thick.

In order to have such a shape despite the vacuum inside the solar panel 10, the transparent plate 12 is provided in curved form during the manufacture of the solar panel 10, such that the deformity of the transparent plate 12 due to gravity and the vacuum created in the solar panel 10 counter the curve, causing it to become flat.

Additionally, the lateral faces 16A, 16B and the lower face 14 are preferably formed by plates that are opaque to solar rays.

The thermal solar panel 10 includes at least one heat collecting element 18, intended to receive solar rays, housed in a housing 20 positioned in the inner space 17.

Advantageously, this heat collecting element 18 is generally plane-parallel in shape, so as to have an optimal value in the solar panel 10.

The housing 20 is delimited by a lower wall 22, lateral walls 24, and an upper wall 26.

The lower wall 22 is formed by the opaque plate that forms the lower face 14. In addition, the lateral walls 24 are formed by the lateral plates forming the lateral faces 16A, 16B. Lastly, the upper wall 26 is arranged between the upper 12 and lower faces 14 of the panel 10, parallel to these faces 12, 14, and includes slits 28 through which solar rays pass inside the housing 20.

In order to limit thermal losses issuing from the heat collecting element 18, the thermal panel 10 includes at least one reflective area arranged to face the heat collecting element 18. Such a reflective area is suited to reflect thermal radiation emitted by the heat collecting element 18.

In accordance with first embodiment described, at least one wall, amongst the lower wall 22, the lateral walls 24, and the upper wall 26, has one such reflective area. Advantageously, each wall 22, 24, and 26 of the housing 20 has such a reflective area, and each of these reflective areas extends over the entire corresponding wall. Thus, almost the entirety of the thermal radiation emitted by the collector 18 is reflected by the walls 22, 24, and 26 of the housing 20, to be re-absorbed by the heat collecting element 18. The thermal losses due to thermal radiation emitted by the collector 18 are thus limited, and the thermal performance of the panel 10 is particularly high.

For example, each reflective area is formed by a reflective coating, e.g., an aluminium coating, applied to the corresponding wall 22, 24, 26.

It will be noted that the quality of the reflection by these reflective areas is preserved over time because the inside of the solar panel 10 is a vacuum; thus, these reflective areas are not subject to oxidation by the air.

In order to limit the thermal radiation passing through the slits 28, as well, the reflective strips 30 are arranged in the inner space 17 outside of the housing 20. To this end, each reflective strip is arranged between the housing 20 and the upper face 12 of the solar panel 10, extending parallel to the longitudinal lateral faces 16A facing a respective slit 28. Preferably, each reflective strip 30 is arranged on a lower face of the transparent plate 12, and its width is perceptibly identical to the width of the slit 28 opposite which it is arranged.

Thus, the thermal radiation emitted by the collector 18 and passing through the slits 28 is reflected and returned almost entirely by these reflective strips 30 in the direction of the heat collecting element 18.

The reflective strips 30 are, e.g., made by placing a reflective layer, e.g., aluminium or silver, on the inner face of the transparent plate 12.

It will be noted that the quality of the reflection by these reflective strips 30 is also preserved over time, because the inside of the solar panel 10 in which these reflective strips 30 are housed, is a vacuum.

In order to sure that a maximum of solar rays is focused towards the heat collecting element 18 in the housing 20 through the slits 28, the solar panel 10 includes several reflective elements 32, such as those shown in greater detail in FIG. 3.

Each reflective element 32 is generally elongated in shape so as to extend over the length of one dimension, e.g., the entire length of the solar panel 10. These elongated elements 32 are, inter alia, juxtaposed along another dimension, e.g., the entire width of the solar panel 10.

As shown in FIG. 3, each reflective element 32 includes a flat base 34 and two parabolic concave surfaces 32, so as to have a perceptibly curvilinear, triangular cross section.

As shown in FIG. 1, the reflective elements 32 are juxtaposed so that their bases 34 are coplanar, and so that these bases 34 together form the upper wall 26 of the housing 20. Each slit 28 of this upper wall 26 is thus formed by a space left between two adjacent reflective elements 32.

It should be noted that the flat base 34 of each reflective element 32 is covered with a reflective coating, e.g., aluminium, so as to form the reflective area of the upper wall 26.

Each parabolic surface 36 is arranged to face a reflective strip 30, such that the solar rays reflected by each parabolic surface 36 are focused towards the corresponding reflective strip 30, which, in turn, focuses these solar rays towards the heat collecting element 18, through the slits 28.

Figure 5:
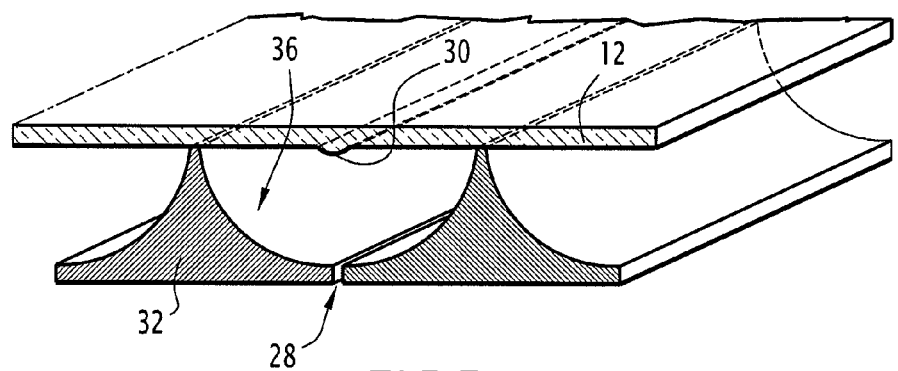
FIG. 5 is a perspective view of a thermal radiation focusing device including reflective elements such as that in FIG. 3.

Advantageously, each pair of adjacent reflective elements 32 forms a primary parabolic mirror 36, having a slit 28 in its centre, and the reflective strip 30, arranged to face this pair of reflective elements 32, forms a secondary hyperbolic convex mirror as shown in FIG. 5. Such a hyperbolic convex reflective strip 30 is preferably placed, e.g., by adhesion, on the inner face of the transparent plate 12.

Figure 6:
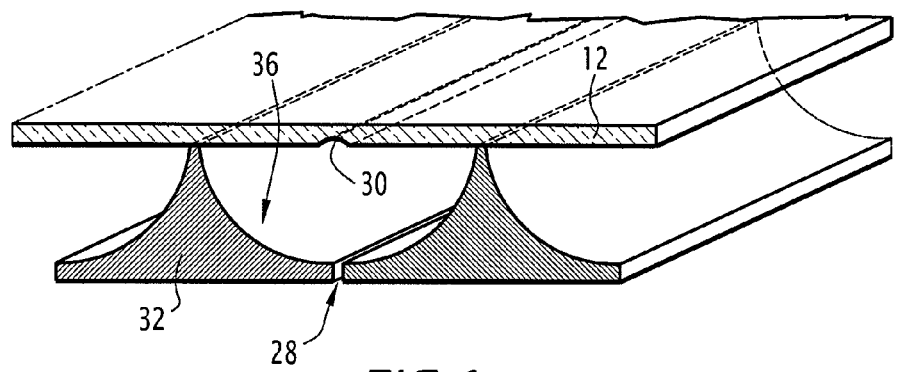
FIG. 6 is a view similar to FIG. 5, of a thermal radiation focusing device according to one embodiment.

In one variant, shown in FIG. 6, the reflective strip 30 forms a secondary elliptical concave mirror. Such an elliptical reflective strip 30 is preferably created by creating a cavity in the inner face of the transparent plate 12 so as to obtain this concave elliptical form, then by applying a reflective layer.

In both cases, the reflective elements 32 and the reflective strip 30 are arranged such that the optical axes of the primary 36 and secondary mirrors 30 coincide, and the focus of the primary parabolic mirror 36 coincides with a first focus of the secondary hyperbolic or elliptical mirror.

The solar rays are reflected on the primary parabolic mirror 36 in the direction of the focus of this parabolic mirror. Because this focus is also the first focus of the secondary hyperbolic or elliptical mirror 30, the rays are then reflected towards a second focus of this secondary mirror 30.

It is thus possible to focus reliably and precisely the solar radiation towards the opening 28.

In the example shown in FIG. 1, the solar panel 10 also includes two elongated lateral reflective elements 38, shown in greater detail in FIG. 4. These lateral elements 38 each have a flat base 40, arranged coplanarly with the bases 34 of the reflective elements 32, a concave face 42 arranged to face a corresponding reflective strip 30, and a flat face 44 intended to be affix in support of the lateral plates forming the lateral longitudinal faces 16A.

It should be noted that each elongated reflective element 32, 38 is affixed by its longitudinal extremities on the transverse lateral faces 16B of the solar panel 10. For example, a raised edge (not shown) is provided on each of the transverse lateral faces 16B, the longitudinal extremities of each elongated reflective element 32, 38, resting and adhering to a respective raised edge.

The elongated reflective elements 32, 38, are made, e.g., of glass, by casting or extrusion, and covered with a reflective coating, e.g., aluminium in order to provide them with their reflective function. In accordance with the embodiment described, each elongated reflective element 32 (or 38) has a length of 1 m, a width of 10 cm (or 5 cm), and a height of 2 cm.

It will be noted that the quality of the reflection by these reflective strips 32, 38 is preserved over time, because the inside of the solar panel 10 in which these reflective strips 32, 38 are housed, is a vacuum.

In order to optimise the performance of the thermal solar panel 10 by limiting thermal losses of the collector 18, the housing 20 advantageously includes thermal insulation spacers 46, arranged between the heat collecting element 18 and the lower wall of the housing 20. Thus, the heat collecting element 18 does not rest directly on the inner wall 22, and thus does not exchange heat by conduction with this inner wall 22.

Figure 7:
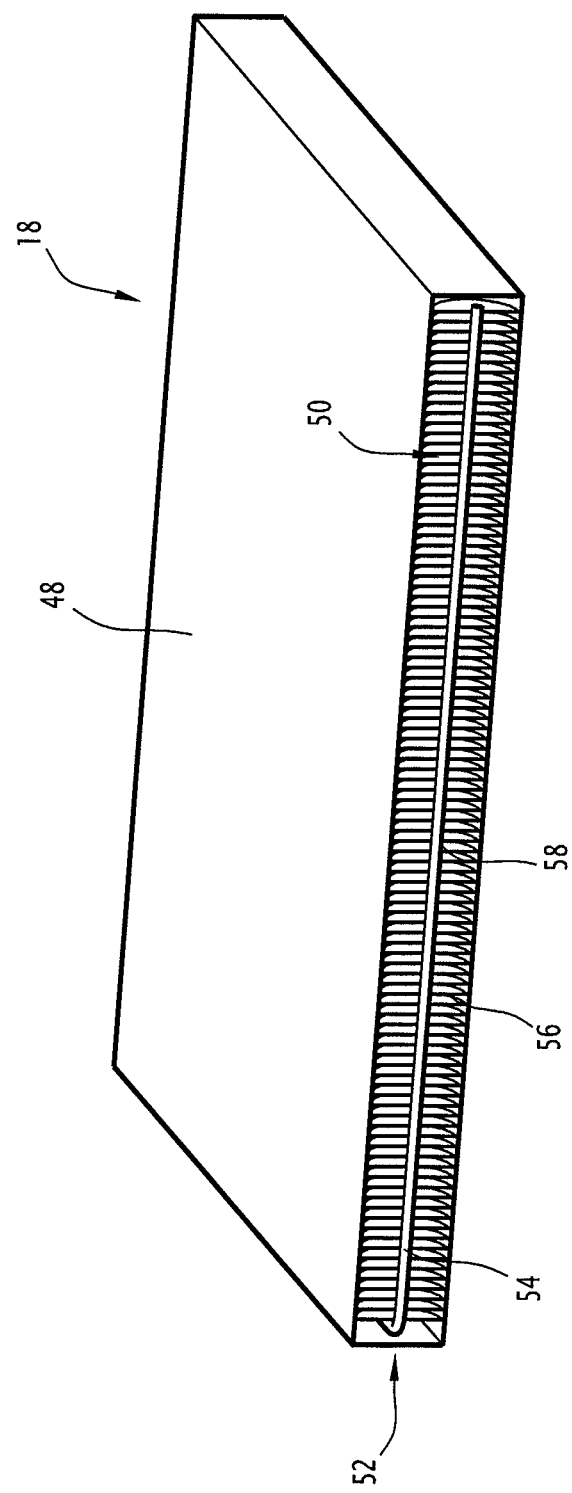
FIG. 7 is a perspective view of a heat collecting element equipping the solar panel of FIG. 1.

FIG. 7 shows an example of a heat collecting element 18. This heat collecting element 18 includes a wrapping 48 capable of absorbing the solar and/or thermal radiation, preferably metallic, enveloping a phase-changing material 50.

The wrapping 48 is preferably metallic, and made of a material chosen based on the temperature that the heat collecting element 18 must attain. The surface of this wrapping 48 is treated using classical methods in order to give it an optimal capacity to absorb the thermal energy received. For example, the wrapping 48 is covered with a coating that is black in colour.

It will be noted that a phase-changing material is a material capable of accumulating or giving off thermal energy at a constant temperature by a change in physical state at this temperature. The value used to quantify the energy brought into play during a phase change is the latent heat.

Thus, the heat collecting element 18 according to the invention has a heat accumulating function in addition to its heat collecting function.

The phase-changing material 50 is chosen based on the working temperature of the heat collecting element 18.

For example, at low temperatures (below 100° C.), the phase-changing element 50 is chosen from paraffin or stearic acid.

At high temperatures (greater than 300° C.), the phase-changing material 50 is, e.g., aluminium (having a melting point of 658° C. and a latent melting heat of 395 kJ/kg).

At intermediate temperatures (between 150 and 300° C.), the phase-changing material 50 is chosen from paraffin or stearic acid. The latent melting heat of this material is sufficiently high so that a reasonable amount of it (between 40 and 100 kg per m² of panel) can allow for heat replacement over 24 hours at a constant temperature equal to the aforementioned melting point. Additionally, the safety profile of anthraquinone allows it to be manipulated in total safety during the manufacture of the solar panel 10. Lastly, anthraquinone, as a pure substance, has the advantage of not being subject to thermal decomposition as is the case, for certain materials used in the prior art.

Preferably, the heat collecting element 18 also includes a heat exchanger 52, housed in the wrapping 48, intended to exchange heat between the phase-changing element 50 and a coolant 54 circulating in this heat exchanger. The heat exchanger 52 preferably includes fins 56 plunged into the phase-changing material 50.

The coolant 54 circulates in the wrapping 48 in a circulation tube 58 around which the fins 56 extend. The circulation tube 58 extends within the heat collecting element 18, e.g., boustrophedon. This circulation tube 58 is linked to a classical heat engine (not shown) external to the solar panel 20 by means of a tubular entry element 60 and a tubular exit element 62 to transfer the coolant 54. For example, the heat engine is adapted to convert the heat energy into mechanical or electrical energy. In one variant, the solar heat energy may also be recovered in order to produce heat or cooling, e.g., for a heating or air-conditioning system, industrial or domestic.

The tubular entry 60 and exit 62 elements pass through respective orifices 63 placed in a lateral face of the housing 20, e.g., a transverse lateral face 16B, as shown in FIG. 2, in the direction of the heat engine.

Preferably, a joint 64 is arranged between the tubular element 60 and the corresponding orifice. This joint 64 is airtight so as to allow for the preservation of the vacuum within the solar panel 20, and the joint 64 is a thermal insulator so as not to cause heat losses.

For optimal operation, the solar panel is orientated southward during its construction. Additionally, the solar panel 10 is manoeuvred by an orientation device of the solar panel 10, intended to keep the upper face 12 of the solar panel 10 in a direction perpendicular to the plane of the ecliptic in order to ensure substantial exposure to the sun.

When the solar panel 10 is exposed to the sun, the solar rays pass through the upper transparent face 12. These solar rays are reflected on the concave faces 36, 42 of the reflective elements 32, 38, so as to focus these solar rays on the reflective strips 30.

Each reflective strip 30 then focuses the solar rays received through the corresponding slit 28 towards the heat collecting element 18.

The solar panel 10 according to the invention allows for reduction of the thermal losses emitted by the heat collecting element 18.

In particular, the creation of a vacuum within the solar panel 10 limits convection around the heat collecting element 18. Additionally, the thermal insulation spacers 46, arranged between the heat collecting element 18 and the lower wall 22 of the housing 20, limit conduction between this heat collecting element 18 and this lower wall 22.

Additionally, the thermal radiation emitted by the heat collecting element 18 is confined within the solar panel 18 because the walls of the housing 20 are treated to reflect this thermal radiation.

Additionally, the external surface of the wrapping 48 of the heat collecting element 18 is treated to absorb the most solar radiation possible transmitted by the reflective strips 30 and the thermal radiation reflected by the faces of the housing 20.

The weak fraction of this thermal radiation emitted towards the outside of the housing 20 through the slits 28 is almost entirely returned to the heat collecting element 18 by means of the reflective strips 30.

Figure 8:
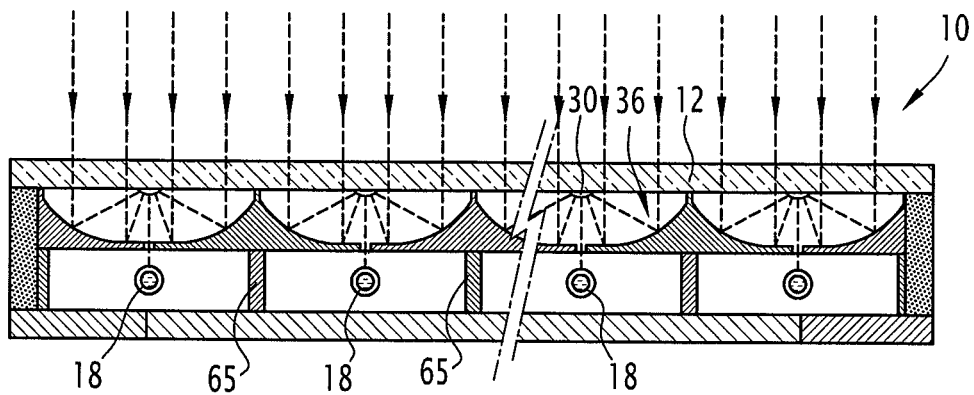
FIG. 8 is a perspective view of a solar panel in cross section, according to a second exemplary embodiment of the invention.
Figure 9:
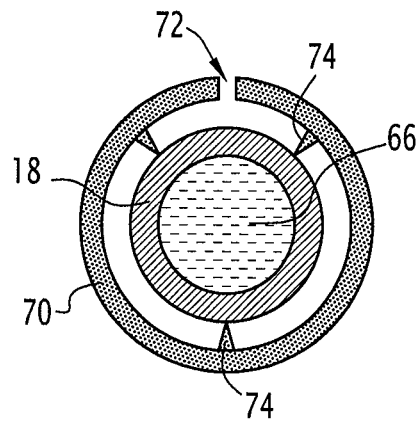
FIG. 9 is a perspective cross-section view of a heat collecting element equipping the solar panel of FIG. 8.

A thermal solar panel 10 according to a second exemplary embodiment has been represented in FIG. 8. In this figure, the elements analogous to those of the foregoing figures are indicated by identical references.

According to this second embodiment, the solar panel 10 includes several heat collecting elements 18, in particular a heat collecting element 18 by a group of primary 36 and secondary mirrors 30.

Each of these heat collecting elements 18 has a heat transfer function towards a heat storage element arranged, e.g., outside the thermal panel 10, which will be described below by reference to FIG. 10.

Preferably, the thermal solar panel 10 includes spacers 65, arranged between two adjacent heat collecting elements 18, and extending between the flat base 34 of a reflective element 32 and the lower face 14 of the panel 10, so as to delimit the respective housings for the heat collecting elements. Advantageously, these spacers 65 include a reflective coating.

An example of a heat collecting element 18 is shown in FIG. 8.

This heat collecting element 18 is formed by a tubular heat transfer element in which a coolant 66 circulates to ensure heat transfer. Preferably, this tubular heat collecting element 18 is provided with a highly absorbent external coating (ensuring heat absorption as close as possible to 100%) and having low heat emission so that the tubular element 18 emits a minimum of thermal radiation when it is brought to a high temperature.

An example of such a coating is set forth in the publication "Optimization of a solution chemically derived spectrally selective solar absorbing surface", by Bostrom T., Westin G. & Wäkelgard E., in "Solar Energy Materials and Solar Cells"—2007, vol. 91, pp. 38-43, or in the publication "Some aspects regarding I.R. absorbing materials based on thin alumina films for solar-thermal energy conversion, using X-ray diffraction technique", by Mitrea S. A., Hodorogea S. M., Duta A., Isac L., Purghel E. & Voinea M., in "Engineering and Technology"—2008, vol. 47—World Academy of Science.

Preferably, the tubular heat collecting element 18 is arranged so that the reflective elements 32 and the reflective strips 30 focus the solar rays on the upper generator of this tubular element 18. In particular, this upper generator coincides with the focal line of the secondary hyperbolic or elliptical mirror 30.

In accordance with this second embodiment, a reflective area is borne by a tubular reflection element 70, coaxially surrounding the tubular heat collecting element 18.

This tubular reflection element 70 is preferably formed by an insulating material having an inner surface that is metal-coated to make it reflective to the residual thermal radiation emitted by the tubular heat transfer element 18, and including, on its upper generator, a slit 72 intended to allow the incident solar rays to pass through.

In order to maintain the heat collecting element in the tubular reflection element 70, this tubular reflection element 70 is interspersed with centring rings, preferably consisting of the same insulating material as the tubular element 70, and having internal tips 74. These internal tips 74 make it possible, in particular, to fix the position of the upper generator of the tubular heat collecting element 18, no matter what the temperature of the coolant 66 is.

Preferably, the tips 74 are made of an insulating material, and are conical in shape, with the apex cooperating with the tubular heat collecting element 18 in order to minimise contact between these tips 74 and the heat collecting element 18. Thus, thermal losses are minimised by the contact of the heat collecting element 18 with the tips 74.

Figure 10:
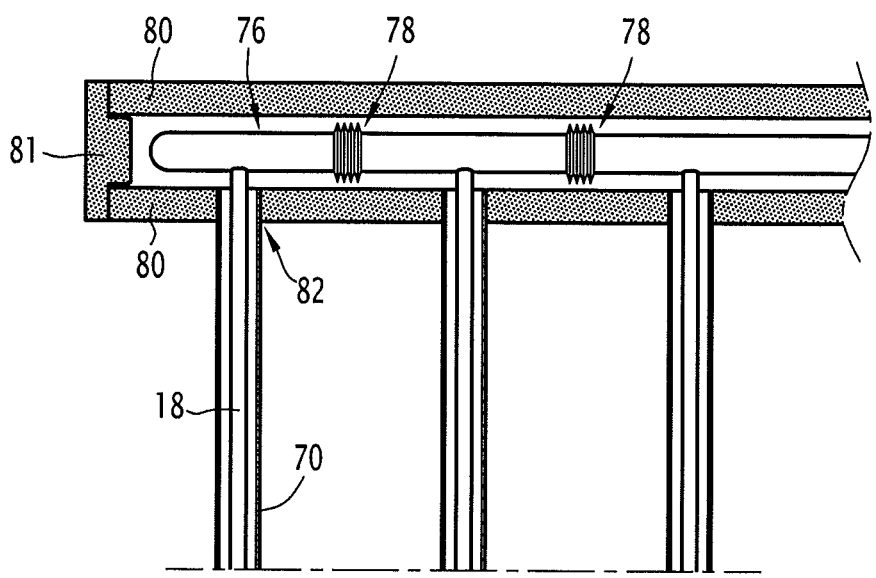
FIG. 10 is a view from above of a heat storing element equipping the solar panel of FIG. 8.

FIG. 10 shows a thermal fluid introduction or evacuation element 76, arranged inside the panel 10. Such elements 76, on the one hand, for introduction, and for evacuation on the other, are arranged respectively on one side and the other of the panel 10, within the panel 10. The introduction and evacuation elements are identical, and ensure the introduction of the thermal fluid to be heated, and the evacuation of the thermal fluid heated, respectively.

Each element 76 is linked to the heat collecting elements 18 in order to introduce or evacuate the thermal fluid circulating in these heat collecting elements 18.

Advantageously, the element 76 includes bellows-shaped portions 78, allowing for longitudinal thermal dilatation of this element 76.

The element 76 is housed in an enclosure laterally prolonging the panel 10, delimited by walls 80 in thermally insulating material, and by an obturator 81.

Preferably, these walls 80 have a reflective inner surface. It should be noted that this enclosure is sufficiently spacious to allow for radial thermal dilatation of the element 76.

At least one of the walls 80 has openings 82 for the passage of heat collecting elements 18 originating from the panel 10 to the element 76. Preferably, each opening 82 is completed with a thermally insulating joint intended to avoid heat losses through this opening, similar to the openings 63 and the airtight, insulating joints 64 described above by reference to FIG. 2. It should be noted that this wall 80 having an opening generally forms a lateral wall 16B of the panel.

Preferably, when the panel 10 is arranged at an incline with regard to the horizontal, in particular in order to be perpendicular to the solar rays, the enclosure in which the element for the introduction of the thermal fluid to be heated is arranged forms a lower part of the panel, and the enclosure in which the element for the evacuation of the thermal fluid heated is arranged forms an upper part of the panel.

The invention is not limited to the embodiments described above, and could present various variants without exceeding the scope of the claims.

In particular, a group of solar panels could be provided, including several solar panels as defined above, arranged such that their upper transparent faces 12 are arranged on the same plane.

In this case, the lateral walls of adjacent panels can have openings, such that the inner spaces of these adjacent solar panels communicate with one another, with the group of inner spaces remaining hermetically sealed off from the outside. Thus, it is possible to create the vacuum in these adjacent solar panels in a sole operation. Additionally, the coolant circuit 54 may pass through several solar panels whilst remaining in a vacuum environment.

What is claimed is:

1. A thermal solar panel comprising:
   at least one heat collector to receive solar rays;
   a housing for the heat collector, the housing being delimited by walls surrounding the heat collector, at least one of the walls including at least one slit for passage of the solar rays;
   at least one reflective area arranged facing the heat collector, the reflective area being suited to reflect thermal radiation emitted by the heat collector;
   at least one reflective strip, arranged outside of the housing, each of the at least one reflective strip being arranged facing one respective slit so as to focus radiation received towards the respective slit; and
   a plurality of elongated reflective elements, each elongated reflective element including a flat base and two concave surfaces so as to define a perceptively triangular cross section, the elongated reflective elements being arranged side by side such that the flat bases are coplanar and, together, define the wall of the housing including the at least one slit, each slit being formed by a space between two adjacent elongated reflective elements, and each concave surface being arranged facing a respective reflective strip so that radiation reflected by a concave surface is focused towards the corresponding reflective strip.

2. The thermal solar panel as recited in claim 1 wherein the at least one slit includes a plurality of slits.

3. The thermal solar panel as recited in claim 1 wherein each pair of adjacent reflective elements defines a primary parabolic mirror having the slit in a center,
   the reflective strip arranged to face the pair of reflective elements forming a secondary hyperbolic convex mirror, and
   the reflective elements and the reflective strip being arranged such that the optical axes of the primary and secondary mirrors coincide, and a focal line of the primary parabolic mirror coinciding with that of the hyperbolic mirror.

4. The thermal solar panel as recited in claim 1 wherein each pair of adjacent reflective elements defines a primary parabolic mirror having the slit in a centre,
   the reflective strip arranged to face the pair of reflective elements forming a secondary elliptical concave mirror, and
   the reflective elements and the reflective strip being arranged such that the optical axes of the primary and secondary mirrors coincide, and a focal line of the primary parabolic mirror coincides with that of the elliptical mirror.

5. The thermal solar panel as recited in claim 1 wherein each wall of the housing has at least one reflective area arranged to face the heat collector.

6. The thermal solar panel as recited in claim 5 wherein the reflective area extends over an entirety of the respective wall.

7. The thermal solar panel as recited in claim 1 wherein the housing has thermal insulation spacers arranged between the heat collector and at least one of the walls of the housing.

8. The thermal solar panel as recited in claim 1 wherein the panel is generally plane-parallel in shape and defined by lateral faces, a lower face, and an upper face delimiting together an inner space in which the housing is arranged, such that:
   a lower wall of the walls of the housing is formed by the lower face;
   lateral walls of the walls is formed by the lateral faces; and
   the wall comprising the at least one slit being an upper wall of the walls and arranged between the upper and lower faces of the panel, parallel to the upper and lower faces, the upper face being formed by a transparent plate.

9. The thermal solar panel as recited in claim 8 wherein the upper wall is made of glass.

10. The thermal solar panel as recited in claim 1 further comprising a heat transporter, comprising:
    a heat exchanger between the heat collector and a coolant housed in the heat collector;
    at least one tubular element transferring the coolant and linking the heat exchanger with the outside of the solar panel, passing through an orifice placed in at least one of the walls of the housing; and
    at least one airtight, thermally insulating joint between the tubular element and the orifice.

11. The thermal solar panel as recited in claim 1 wherein the heat collector includes a wrapping capable of absorbing the solar and/or thermal radiation.

12. The thermal solar panel as recited in claim 11 wherein the wrapping is metallic and enveloping a phase-changing material.

13. The thermal solar panel as recited in claim 12 wherein the phase-changing material is chosen from anthraquinone or aluminium.

14. The thermal solar panel as recited in claim 1 wherein the heat collector is formed by a tubular element, in which a coolant circulates.

15. The thermal solar panel as recited in claim 14 wherein the tubular element is provided with a highly heat-absorbent external coating with low heat emission.

16. The thermal solar panel as recited in claim 14 wherein a reflective area is formed by a tubular reflection element, coaxially surrounding the tubular heat collector, the tubular reflection element being formed by an insulating material having an internal surface that is treated to permit reflection of residual thermal radiation emitted by the tubular heat collection element, and including on its upper generator a further slit so as to let incident thermal radiation pass through.

17. The thermal solar panel as recited in claim 16 wherein the internal surface is treated with metal.

18. The thermal solar panel as recited in claim 1 further comprising at least one thermal fluid introduction or evacuation element connected to all of the heat collectors, housed within a surrounding wall laterally extending the panel, delimited by walls made of thermally insulating material.

* * * * *